(12) United States Patent
Park et al.

(10) Patent No.: US 11,507,789 B2
(45) Date of Patent: Nov. 22, 2022

(54) ELECTRONIC DEVICE FOR VEHICLE AND METHOD OF OPERATING ELECTRONIC DEVICE FOR VEHICLE

(71) Applicant: LG Electronics Inc., Seoul (KR)

(72) Inventors: Chanho Park, Seoul (KR); Kyunghee Kim, Seoul (KR); Taehui Yun, Seoul (KR); Dongha Lee, Seoul (KR); Gaehwan Cho, Seoul (KR); Jooyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 269 days.

(21) Appl. No.: 16/603,049

(22) PCT Filed: May 31, 2019

(86) PCT No.: PCT/KR2019/006623
§ 371 (c)(1),
(2) Date: Oct. 4, 2019

(87) PCT Pub. No.: WO2020/241954
PCT Pub. Date: Dec. 3, 2020

(65) Prior Publication Data
US 2021/0406618 A1    Dec. 30, 2021

(51) Int. Cl.
*G06K 9/00* (2022.01)
*G06K 9/62* (2022.01)
(Continued)

(52) U.S. Cl.
CPC ............ *G06K 9/6289* (2013.01); *B60R 11/04* (2013.01); *G01S 17/86* (2020.01); *G01S 17/89* (2013.01);
(Continued)

(58) Field of Classification Search
CPC .............. G06K 9/6289; B60R 11/04; B60R 2011/0003; G01S 17/86; G01S 17/89;
(Continued)

(56) References Cited

U.S. PATENT DOCUMENTS 5,947,051 A * 9/1999 Geiger .................... E21B 41/04
114/313
9,020,637 B2 * 4/2015 Schnittman .......... G05D 1/0227
382/106
(Continued)

FOREIGN PATENT DOCUMENTS

CN    110135485 A  *  8/2019
KR    20080113982 A  *  12/2008

OTHER PUBLICATIONS

Ho-Jin Cho (KR 10-2008-0113982), Apparatus and Method for Providing 3D Information of Topography and Feature on the Earth, Dec. 31, 2008, NyuKeuRon Co. Ltd, All pages (year 2008).*

*Primary Examiner* — Mahendra R Patel
(74) *Attorney, Agent, or Firm* — Fish & Richardson P.C.

(57) ABSTRACT

Disclosed is an electronic device for a vehicle, including a processor receiving first image data from a first camera, receiving second image data from a second camera, receiving first sensing data from a first lidar, generating a depth image based on the first image data and the second image data, and fusing the first sensing data for each of divided regions in the depth image.

14 Claims, 14 Drawing Sheets

(51) Int. Cl.
| | |
|---|---|
| *G06T 7/55* | (2017.01) |
| *G01S 17/931* | (2020.01) |
| *G01S 17/86* | (2020.01) |
| *G06V 10/25* | (2022.01) |
| *G06V 20/56* | (2022.01) |
| *B60R 11/04* | (2006.01) |
| *G01S 17/89* | (2020.01) |
| *B60W 60/00* | (2020.01) |
| *B60R 11/00* | (2006.01) |
| *B60W 40/02* | (2006.01) |

(52) U.S. Cl.
CPC .............. *G01S 17/931* (2020.01); *G06T 7/55* (2017.01); *G06V 10/25* (2022.01); *G06V 20/56* (2022.01); *B60R 2011/0003* (2013.01); *B60W 40/02* (2013.01); *B60W 60/001* (2020.02); *B60W 2420/42* (2013.01); *B60W 2420/52* (2013.01); *B60W 2556/35* (2020.02); *G06T 2207/10024* (2013.01); *G06T 2207/20021* (2013.01); *G06T 2207/30252* (2013.01)

(58) Field of Classification Search
CPC ..................... G01S 17/931; G06T 7/55; G06T 2207/10024; G06T 2207/20021; G06T 2207/30252; G06V 10/25; G06V 20/56; G06V 10/759; G06V 10/803; B60W 40/02; B60W 60/001; B60W 2420/42; B60W 2420/52; B60W 2556/35; H04N 13/239; H04N 13/271; B60Y 2300/14

USPC ....................................................... 382/103
See application file for complete search history.

(56) References Cited

U.S. PATENT DOCUMENTS

| | | | |
|---|---|---|---|
| 9,037,396 B2* | 5/2015 | Pack | G01C 21/20 |
| | | | 701/409 |
| 10,699,430 B2* | 6/2020 | Chondro | G06T 7/593 |
| 2014/0267243 A1* | 9/2014 | Venkataraman | G06T 7/557 |
| | | | 345/419 |
| 2015/0077560 A1* | 3/2015 | Zhang | G06V 20/58 |
| | | | 348/148 |
| 2016/0014395 A1* | 1/2016 | Murray | H04N 5/33 |
| | | | 348/42 |
| 2016/0295198 A1* | 10/2016 | Grossman | H04N 13/271 |
| 2017/0243352 A1* | 8/2017 | Kutliroff | G06T 19/006 |
| 2017/0253330 A1* | 9/2017 | Saigh | G08G 5/0069 |
| 2017/0314930 A1* | 11/2017 | Monterroza | G06N 3/049 |
| 2018/0139431 A1* | 5/2018 | Simek | H04N 5/2258 |
| 2019/0012806 A1* | 1/2019 | Lehmann | G06T 7/70 |
| 2019/0052844 A1* | 2/2019 | Droz | G01S 17/86 |
| 2019/0180467 A1* | 6/2019 | Li | G01S 17/931 |
| 2019/0289282 A1* | 9/2019 | Briggs | H04N 13/296 |
| 2019/0349571 A1* | 11/2019 | Herman | H04N 5/247 |
| 2019/0362544 A1* | 11/2019 | Pekelny | G06T 15/08 |
| 2020/0372262 A1* | 11/2020 | Ma | G06V 20/588 |
| 2021/0004614 A1* | 1/2021 | Buerker | G06V 20/58 |
| 2021/0012165 A1* | 1/2021 | Jiang | G06F 16/2465 |

* cited by examiner

FIG. 10

| TABLE 1 | DEPTH IMAGE COLOR(4bit) | LIDAR DISTANCE INFORMATION | LIDAR INTENSITY INFORMATION |
|---|---|---|---|
| Data1 | (R,G,B)=(0,0,0) | 100 | A |
| Data2 | (0,0,1) | 101 | B |
| Data3 | (0,0,2) | 102 | C |
| ⋮ | ⋮ | ⋮ | ⋮ |
| Data16 | (0,0,15) | xxx | xxx |
| ⋮ | ⋮ | ⋮ | ⋮ |
| Data32 | (0,1,15) | xxx | xxx |
| ⋮ | ⋮ | ⋮ | ⋮ |
| Data256 | (0,15,15) | xxx | xxx |
| ⋮ | ⋮ | ⋮ | ⋮ |
| Data4096 | (15,15,15) | xxx | xxx |

← 1010

| TABLE 1 | DEPTH IMAGE COLOR(RED ONLY) | LIDAR DISTANCE INFORMATION | LIDAR INTENSITY INFORMATION |
|---|---|---|---|
| Data1 | (R,G,B)=(0,0,0) | 100 | A |
| Data2 | (1,0,0) | 101 | B |
| Data3 | (2,0,0) | 102 | C |
|  | ⋮ |  |  |
| Data256 | (255,0,0) | 201 | x |

← 1020

PIXEL CONTAINING
LIDAR DISTANCE INFORMATION
($T^{TH}$ FRAME)

PIXEL CONTAINING NO
LIDAR DISTANCE INFORMATION
($(T+1)^{TH}$ FRAME)

$(T+1)^{TH}$ FRAME

MOVING DISTANCE
OF HOST VEHICLE : d $T^{TH}$ FRAME

RECOGNIZE VEHICLE USING CAMERA IMAGE
AND EXTRACT OUTLINE OF VEHICLE FROM DEPTH IMAGE

ELECTRONIC DEVICE FOR VEHICLE AND METHOD OF OPERATING ELECTRONIC DEVICE FOR VEHICLE

CROSS-REFERENCE TO RELATED APPLICATION

This application is a National Stage application under 35 U.S.C. § 371 of International Application No. PCT/KR2019/006623, filed on May 31, 2019, which is incorporated by reference.

TECHNICAL FIELD

The present disclosure relates to an electronic device for a vehicle and a method of operating an electronic device for a vehicle.

BACKGROUND ART

A vehicle is an apparatus that carries a passenger in the direction intended by the passenger. A car is the main example of such a vehicle. An autonomous vehicle is a vehicle that is capable of traveling autonomously without driving operation by a driver. Such an autonomous vehicle is provided with a plurality of sensors for detecting objects outside the vehicle. Examples of such sensors include a camera, a lidar, a radar, an ultrasonic sensor, and the like.

Most sensors for detecting objects outside a vehicle are expensive, and these expensive sensors are not suitable for use in general autonomous vehicles. General autonomous vehicles require sensors that are capable of being applied thereto at low cost while providing performance similar to that of expensive sensors.

DISCLOSURE

Technical Problem

Therefore, the present disclosure has been made in view of the above problems, and it is an object of the present disclosure to provide an electronic device for a vehicle that performs low-level sensor fusion.

It is another object of the present disclosure to provide an electronic device for a vehicle that includes a camera and a lidar and performs low-level sensor fusion to combine data generated by the camera with data generated by the lidar.

However, the objects to be accomplished by the disclosure are not limited to the above-mentioned objects, and other objects not mentioned herein will be clearly understood by those skilled in the art from the following description.

Technical Solution

In accordance with an aspect of the present disclosure, the above and other objects can be accomplished by the provision of an electronic device for a vehicle, including a processor receiving first image data from a first camera, receiving second image data from a second camera, receiving first sensing data from a first lidar, generating a depth image based on the first image data and the second image data, and performing fusion of the first sensing data for each of divided regions in the depth image.

In accordance with another aspect of the present disclosure, there is provided an electronic device for a vehicle, including a first sensing device mounted in a vehicle, the first sensing device including a first camera generating first image data and a first lidar generating first sensing data, a second sensing device mounted in the vehicle so as to be spaced apart from the first sensing device, the second sensing device including a second camera generating second image data and a second lidar generating second sensing data, and at least one processor generating a depth image based on the first image data and the second image data and performing fusion of the first sensing data and the second sensing data for each of divided regions in the depth image.

Details of other embodiments are included in the detailed description and the accompanying drawings.

Advantageous Effects

According to the present disclosure, there are one or more effects as follows.

It is possible to provide a sensor that detects a distance with enhanced accuracy using a low-priced camera and lidar.

However, the effects achievable through the disclosure are not limited to the above-mentioned effects, and other effects not mentioned herein will be clearly understood by those skilled in the art from the appended claims.

DESCRIPTION OF DRAWINGS

FIG. 10 is a view for explaining a table in which distance values for respective colors are arranged according to the embodiment of the present disclosure.

BEST MODE

Reference will now be made in detail to the preferred embodiments of the present disclosure, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing embodiments disclosed in this specification, a detailed description of relevant well-known technologies may not be given in order not to obscure the subject matter of the present disclosure. In addition, the accompanying drawings are merely intended to facilitate understanding of the embodiments disclosed in this specification and not to restrict the technical spirit of the present disclosure. In addition, the accompanying drawings should be understood as covering all equivalents or substitutions within the scope of the present disclosure.

Terms including ordinal numbers such as first, second, etc. may be used to explain various elements. However, it will be appreciated that the elements are not limited to such terms. These terms are merely used to distinguish one element from another.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

The expression of singularity includes a plural meaning unless the singularity expression is explicitly different in context.

It will be further understood that terms such as "include" or "have", when used in this specification, specify the presence of stated features, integers, steps, operations, elements, components, or combinations thereof, but do not preclude the presence or addition of one or more other features, integers, steps, operations, elements, components, or combinations thereof.

Figure 1:
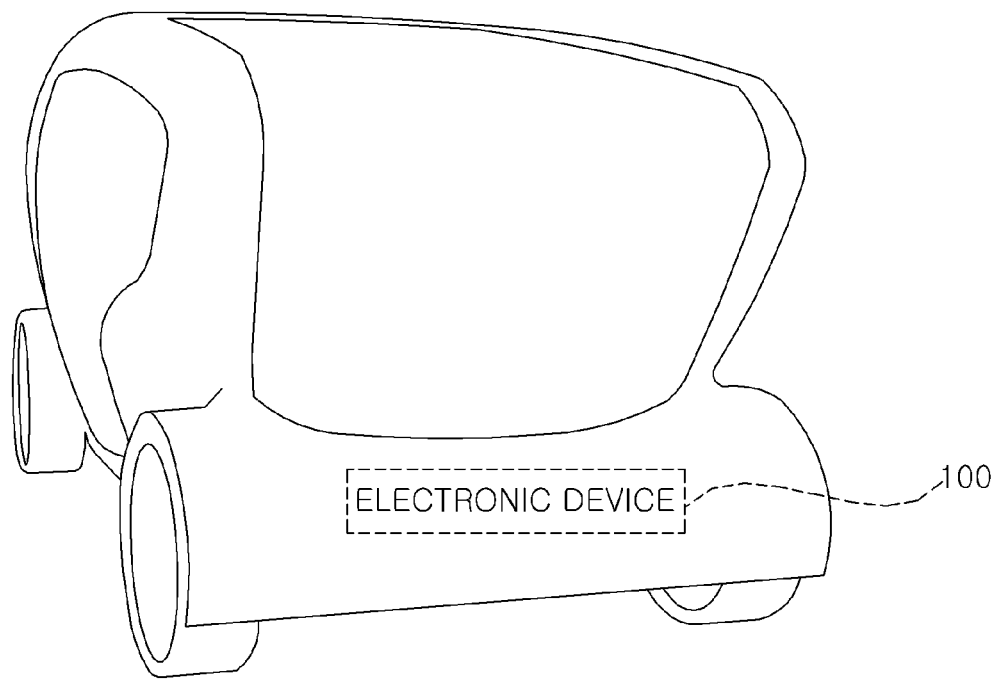
FIG. 1 is a view illustrating the external appearance of a vehicle according to an embodiment of the present disclosure.
Figure 1:
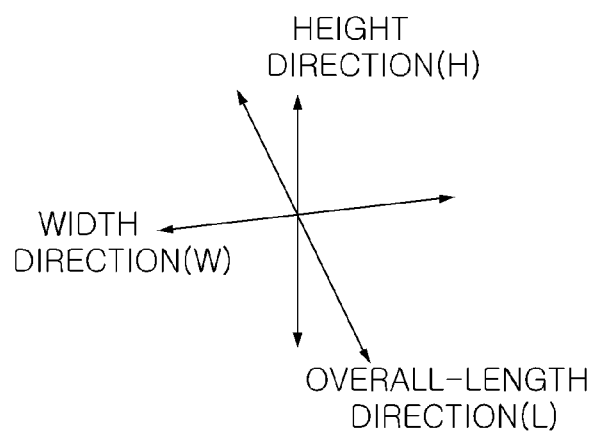

FIG. 1 is a view illustrating a vehicle according to an embodiment of the present disclosure.

Referring to FIG. 1, a vehicle 10 according to an embodiment of the present disclosure is defined as a transportation means that travels on a road or on rails. The vehicle 10 conceptually encompasses cars, trains, and motorcycles. The vehicle 10 may be any of an internal combustion vehicle equipped with an engine as a power source, a hybrid vehicle equipped with an engine and an electric motor as power sources, an electric vehicle equipped with an electric motor as a power source, and the like. The vehicle 10 may be a shared vehicle. The vehicle 10 may be an autonomous vehicle.

The vehicle 10 may include an electronic device 100. The electronic device 100 may be a device that generates information about objects outside the vehicle. The information about objects may include information about the presence or absence of an object, information about the location of an object, information about the distance between the vehicle 100 and an object, and information about the relative speed of the vehicle 100 with respect to an object. An Object may include at least one of a lane, another vehicle, a pedestrian, a 2-wheeled vehicle, a traffic signal, a light, a road, a structure, a speed bump, a geographic feature, or an animal.

Figure 2:
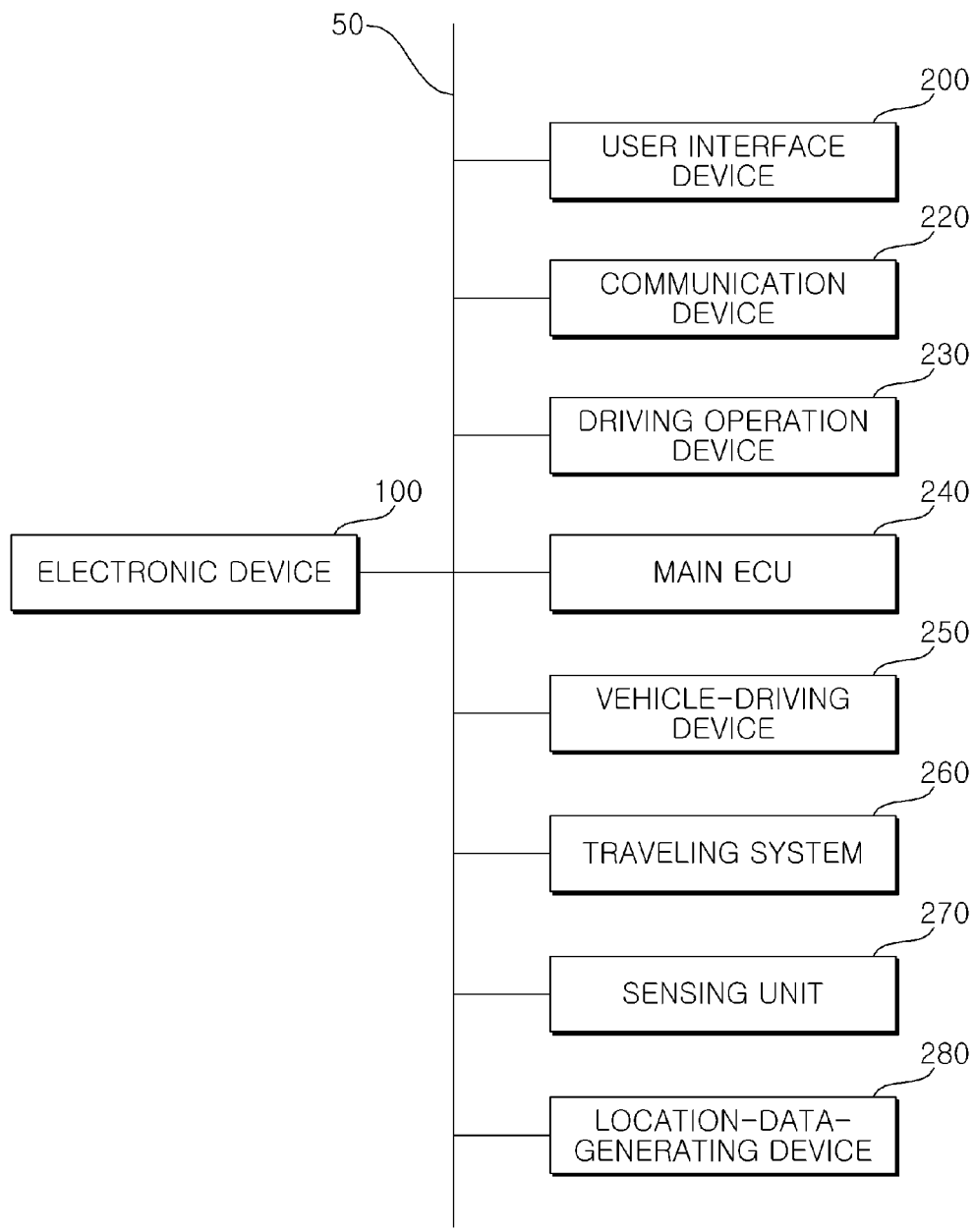
FIG. 2 is a control block diagram of the vehicle according to the embodiment of the present disclosure.

FIG. 2 is a control block diagram of the vehicle according to the embodiment of the present disclosure.

Referring to FIG. 2, the vehicle 10 may include a vehicular electronic device 100, a user interface device 200, a vehicular electronic device 100, a communication device 220, a driving operation device 230, a main ECU 240, a vehicle-driving device 250, a traveling system 260, a sensing unit 270, and a location-data-generating device 280.

The vehicular electronic device 100 may detect objects outside the vehicle 10. The vehicular electronic device 100 may include at least one sensor capable of detecting objects outside the vehicle 10. The vehicular electronic device 100 may include at least one of a camera, a radar, a lidar, an ultrasonic sensor, or an infrared sensor. The vehicular electronic device 100 may provide data on an object, which is generated based on a sensing signal generated by a sensor, to at least one electronic device included in the vehicle. The vehicular electronic device 100 may be referred to as an object detection device.

The user interface device 200 is a device used to enable the vehicle 10 to communicate with a user. The user interface device 200 may receive user input and may provide information generated by the vehicle 10 to the user. The vehicle 10 may implement a User Interface (UI) or a User Experience (UX) through the user interface device 200.

The communication device 220 may exchange signals with devices located outside the vehicle 10. The communication device 220 may exchange signals with at least one of infrastructure (e.g. a server or a broadcasting station) or other vehicles. In order to realize communication, the communication device 220 may include at least one of a transmission antenna, a reception antenna, a Radio-Frequency (RF) circuit capable of implementing various communication protocols, or an RF device.

The driving operation device 230 is a device that receives user input for driving the vehicle. In the manual mode, the vehicle 10 may travel based on a signal provided by the driving operation device 230. The driving operation device 230 may include a steering input device (e.g. a steering wheel), an acceleration input device (e.g. an accelerator pedal), and a brake input device (e.g. a brake pedal).

The main ECU 240 may control the overall operation of at least one electronic device provided in the vehicle 10.

The driving control device 250 is a device that electrically controls various vehicle-driving devices provided in the vehicle 10. The driving control device 250 may include a powertrain driving controller, a chassis driving controller, a door/window driving controller, a safety device driving controller, a lamp driving controller, and an air-conditioner driving controller. The powertrain driving controller may include a power source driving controller and a transmission driving controller. The chassis driving controller may include a steering driving controller, a brake driving controller, and a suspension driving controller.

The safety device driving controller may include a seat belt driving controller for controlling the seat belt.

The vehicle driving control device 250 may be referred to as a control electronic control unit (a control ECU).

The traveling system 260 may generate a signal for controlling the movement of the vehicle 10 or outputting information to the user based on the data on an object received from the vehicular electronic device 100. The traveling system 260 may provide the generated signal to at least one of the user interface device 200, the main ECU 240, or the vehicle-driving device 250.

The traveling system 260 may conceptually include an Advanced Driver Assistance System (ADAS). The ADAS 260 may implement at least one of Adaptive Cruise Control (ACC), Autonomous Emergency Braking (AEB), Forward Collision Warning (FCW), Lane Keeping Assist (LKA), Lane Change Assist (LCA), Target Following Assist (TFA), Blind Spot Detection (BSD), High Beam Assist (HBA), Auto Parking System (APS), PD collision warning system, Traffic Sign Recognition (TSR), Traffic Sign Assist (TSA), Night Vision (NV), Driver Status Monitoring (DSM), or Traffic Jam Assist (TJA).

The traveling system 260 may include an autonomous-driving electronic control unit (an autonomous-driving ECU). The autonomous-driving ECU may set an autonomous-driving route based on data received from at least one of the other electronic devices provided in the vehicle 10. The autonomous-driving ECU may set an autonomous-driving route based on data received from at least one of the user interface device 200, the vehicular electronic device 100, the communication device 220, the sensing unit 270, or the location-data-generating device 280. The autonomous-driving ECU may generate a control signal so that the vehicle 10 travels along the autonomous-driving route. The control signal generated by the autonomous-driving ECU may be provided to at least one of the main ECU 240 or the vehicle-driving device 250.

The sensing unit 270 may sense the state of the vehicle. The sensing unit 270 may include at least one of an inertial navigation unit (IMU) sensor, a collision sensor, a wheel sensor, a speed sensor, an inclination sensor, a weight detection sensor, a heading sensor, a position module, a vehicle forward/reverse movement sensor, a battery sensor, a fuel sensor, a tire sensor, a steering sensor for detecting rotation of the steering wheel, a vehicle internal temperature sensor, a vehicle internal humidity sensor, an ultrasonic sensor, an illuminance sensor, an accelerator pedal position sensor, or a brake pedal position sensor. The inertial navigation unit (IMU) sensor may include at least one of an acceleration sensor, a gyro sensor, or a magnetic sensor.

The sensing unit 270 may generate data on the state of the vehicle based on the signal generated by at least one sensor. The sensing unit 270 may acquire sensing signals of vehicle attitude information, vehicle motion information, vehicle yaw information, vehicle roll information, vehicle pitch information, vehicle collision information, vehicle heading information, vehicle angle information, vehicle speed information, vehicle acceleration information, vehicle inclination information, vehicle forward/reverse movement information, battery information, fuel information, tire information, vehicle lamp information, vehicle internal temperature information, vehicle internal humidity information, a steering wheel rotation angle, vehicle external illuminance, the pressure applied to the accelerator pedal, the pressure applied to the brake pedal, and so on.

The sensing unit 270 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 270 may generate vehicle state information based on the sensing data. The vehicle state information may be generated based on data detected by various sensors included in the vehicle.

For example, the vehicle state information may include vehicle attitude information, vehicle speed information, vehicle inclination information, vehicle weight information, vehicle heading information, vehicle battery information, vehicle fuel information, vehicle tire air pressure information, vehicle steering information, vehicle internal temperature information, vehicle internal humidity information, pedal position information, vehicle engine temperature information, and so on.

The sensing unit may include a tension sensor. The tension sensor may generate a sensing signal based on the tension state of the seat belt.

The location-data-generating device 280 may generate data on the location of the vehicle 10. The location-data-generating device 280 may include at least one of a global positioning system (GPS) or a differential global positioning system (DGPS). The location-data-generating device 280 may generate data on the location of the vehicle 10 based on the signal generated by at least one of the GPS or the DGPS. In some embodiments, the location-data-generating device 280 may correct the location data based on at least one of the inertial measurement unit (IMU) of the sensing unit 270 or the camera of the vehicular electronic device 100.

The location-data-generating device 280 may be referred to as a location positioning device. The location-data-generating device 280 may be referred to as a global navigation satellite system (GNSS).

The vehicle 10 may include an internal communication system 50. The electronic devices included in the vehicle 10 may exchange signals via the internal communication system 50. The signals may include data. The internal communication system 50 may use at least one communication protocol (e.g. CAN, LIN, FlexRay, MOST, and Ethernet).

Figure 3:
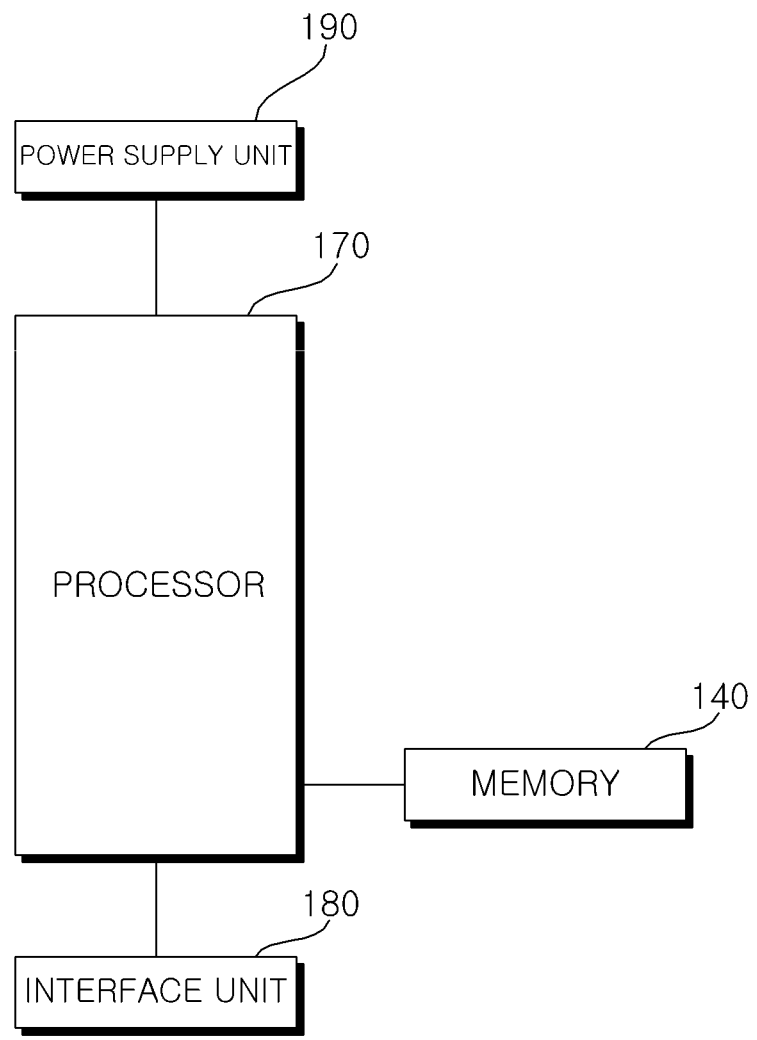
FIG. 3 is a control block diagram of an electronic device for a vehicle according to an embodiment of the present disclosure.

FIG. 3 is a control block diagram of the electronic device according to the embodiment of the present disclosure.

Referring to FIG. 3, the electronic device 100 may include a memory 140, a processor 170, an interface unit 180, and a power supply unit 190.

The memory 140 is electrically connected to the processor 170. The memory 140 may store default data for a unit, control data for controlling the operation of the unit, and input and output data. The memory 140 may store data processed by the processor 170. The memory 140 may be implemented as at least one hardware device selected from among read only memory (ROM), random access memory (RAM), erasable and programmable ROM (EPROM), a flash drive, or a hard drive. The memory 140 may store various data for the overall operation of the electronic device 100, such as programs for processing or control in the processor 170. The memory 140 may be integrated with the processor 170. In some embodiments, the memory 140 may be configured as a lower-level component of the processor 170.

The interface unit 180 may exchange signals with at least one electronic device provided in the vehicle 10 in a wired or wireless manner. The interface unit 280 may exchange signals with at least one of the vehicular electronic device 100, the communication device 220, the driving operation device 230, the main ECU 140, the vehicle-driving device 250, the ADAS 260, the sensing unit 170, or the location-data-generating device 280 in a wired or wireless manner. The interface unit 280 may be configured as at least one of a communication module, a terminal, a pin, a cable, a port, a circuit, an element, or a device.

The interface unit 180 may receive location data of the vehicle 10 from the location-data-generating device 280. The interface unit 180 may receive travel speed data from the sensing unit 270. The interface unit 180 may receive data on objects around the vehicle from the vehicular electronic device 100.

The power supply unit 190 may supply power to the electronic device 100. The power supply unit 190 may receive power from a power source (e.g. a battery) included in the vehicle 10, and may supply the power to each unit of the electronic device 100. The power supply unit 190 may be operated in response to a control signal from the main ECU 140. The power supply unit 190 may be implemented as a switched-mode power supply (SMPS).

The processor 170 may be electrically connected to the memory 140, the interface unit 280, and the power supply unit 190, and may exchange signals with the same. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units for performing other functions.

The processor 170 may be driven by the power supplied from the power supply unit 190. The processor 170 may receive data, process data, generate a signal, and provide a signal while receiving the power from the power supply unit 190.

The processor 170 may receive information from other electronic devices in the vehicle 10 through the interface unit 180. The processor 170 may provide a control signal to other electronic devices in the vehicle 10 through the interface unit 180.

The processor 170 may fuse sensing data, received from various types of sensors, at a low level. The processor 170 may fuse the image data received from the camera and the sensing data received from the lidar at a low level.

The processor 170 may generate a depth image based on the image data photographed by stereo cameras (a first camera and a second camera). The processor 170 may receive first image data from the first camera. The first camera may be mounted in the vehicle 10 and may capture an image of the surroundings of the vehicle 10. The processor 170 may receive second image data from the second camera. The second camera may be mounted in the vehicle 10 at a position different from that of the first camera and may capture an image of the surroundings of the vehicle 10. The second camera may be oriented in the same direction as the first camera. For example, both the first camera and the second camera may be oriented in the forward direction of the vehicle 10. For example, both the first camera and the second camera may be oriented in the backward direction of the vehicle 10. For example, both the first camera and the second camera may be oriented in the leftward direction of the vehicle 10. For example, both the first camera and the second camera may be oriented in the rightward direction of the vehicle 10.

The processor 170 may receive first sensing data from a first lidar. The first lidar may be mounted in the vehicle 10, may emit a laser signal toward the outside of the vehicle 10, and may receive a laser signal reflected by an object. The first sensing data may be data that is generated based on an emitted laser signal and a received laser signal.

The processor 170 may generate a depth image based on the first image data and the second image data. The processor 170 may detect a disparity based on the first image data and the second image data. The processor 170 may generate a depth image based on information about the disparity. The depth image may be configured as a red-green-blue (RGB) image. The depth image may be understood as a depth map.

In some embodiments, the processor 170 may generate a depth image based on image data photographed by a mono camera. The processor 170 may receive first image data photographed at a first time point from the first camera. The processor 170 may receive second image data photographed at a second time point, which is different from the first time point, from the first camera. The location of the first camera at the second time point may be different from the location of the first camera at the first time point. The processor 170 may generate a depth image based on the first image data and the second image data received from the first camera.

The processor 170 may detect an object based on the depth image. For example, the processor 170 may detect, based on the depth image, at least one of a lane, another vehicle, a pedestrian, a 2-wheeled vehicle, a traffic signal, a light, a road, a structure, a speed bump, a geographic feature, or an animal.

The processor 170 may fuse first sensing data received from the first lidar into each region divided in the depth image. The processor 170 may apply the first sensing data to the depth image. By applying the first sensing data to the depth image, a more accurate value of the distance to the object may be acquired than when using only the depth image.

The processor 170 may acquire RGB-level data for each region of the depth image. The processor 170 may refer to a table stored in the memory 140. The table may be a table in which distance values for RGB levels are arranged. The processor 170 may acquire a distance value for each region of the depth image based on the table. The region may be composed of one or a plurality of pixels. The table may be acquired through experimentation and may be stored in advance in the memory 140.

The processor 170 may divide the depth image into a plurality of regions, each of which has a first area. The processor 170 may acquire RGB-level data for each divided region. The processor 170 may divide the depth image such that each of the plurality of regions has a size in which two or three beam points of the first lidar are formed. The two or three beam points of the first lidar may match the first area. The processor 170 may acquire a distance value corresponding to the RGB level for each of the divided regions from the table.

The processor 170 may divide the depth image into a plurality of first regions, each having a first area, and a plurality of second regions, each having a second area, which is larger than the first area. The processor 170 may acquire RGB-level data for each of the divided regions. The processor 170 may acquire a distance value corresponding to the RGB level for each of the divided regions from the table.

The processor 170 may set a region of interest in the depth image. The region of interest may be defined as a region in which the probability that an object is located is high. The processor 170 may divide the region of interest into the plurality of first regions. The processor 170 may set a region, other than the region of interest, as the plurality of second regions in the depth image. The region, other than the region of interest, may be the upper region of the image, which corresponds to the sky, or the lower region of the image, which corresponds to the ground.

The processor 170 may fuse the depth image and the first sensing data using a simultaneous localization and mapping (SLAM) algorithm. The processor 170 may receive first image data photographed at a first time point from the first camera. The processor 170 may receive second image data photographed at the first time point from the second camera. The processor 170 may receive first sensing data acquired at the first time point from the first lidar. The processor 170 may generate a depth image of the first time point based on the first image data photographed at the first time point and the second image data photographed at the first time point. The processor 170 may fuse the first sensing data acquired at the first time point for each of the divided regions in the depth image captured at the first time point. The processor 170 may receive first image data photographed at a second time point from the first camera. The processor 170 may receive second image data photographed at the second time point from the second camera. The processor 170 may generate a depth image of the second time point based on the first image data photographed at the second time point and the second image data photographed at the second time point. The processor 170 may receive first sensing data acquired at the second time point from the first lidar. The processor 170 may fuse the first sensing data acquired at the second time point for each of the divided regions in the depth image of the first time point. The processor 170 may fuse the first sensing data acquired at the second time point for each of the divided regions in the depth image of the second time point. The processor 170 may acquire a moving distance value of the vehicle 10 from the first time point to the second time point. For example, the processor 170 may acquire a moving distance value from the first time point to the second time point based on wheel data received from the wheel sensor of the vehicle 10. For example, the processor 170 may acquire a moving distance value from the first time point to the second time point based on location data generated by the location-data-generating device 280. For example, the processor 170 may acquire a moving distance value from the first time point to the second time point based on a sensing value of the object detection sensor (e.g. a camera, a radar, a lidar, an ultrasonic sensor, an infrared sensor, etc.). The processor 170 may apply the moving distance value to the depth image captured at the first time point, and may fuse the first sensing data acquired at the second time point for the depth image.

The processor 170 may receive location data of another vehicle through the communication device 220. The processor 170 may detect an object corresponding to the other vehicle from the depth image. The processor 170 may correct the value of the distance between the vehicle 10 and the other vehicle based on the location data.

The processor 170 may receive second sensing data from the second lidar. The second lidar may be mounted in the vehicle 10 at a position different from that of the first lidar, may emit a laser signal toward the outside of the vehicle 10, and may receive a laser signal reflected by an object. The second lidar may be oriented in the same direction as the first lidar. For example, both the first lidar and the second lidar may be oriented in the forward direction of the vehicle 10. For example, both the first lidar and the second lidar may be oriented in the backward direction of the vehicle 10. For example, both the first lidar and the second lidar may be oriented in the leftward direction of the vehicle 10. For example, both the first lidar and the second lidar may be oriented in the rightward direction of the vehicle 10. The processor 170 may further fuse the second sensing data for each of the divided regions in the depth image. By using the first lidar and the second lidar together, it is possible to obtain the effect of expanding the channel of the lidar.

The electronic device 100 may include at least one printed circuit board (PCB). The memory 140, the interface unit 180, the power supply unit 190, and the processor 170 may be electrically connected to the printed circuit board.

Figure 4:
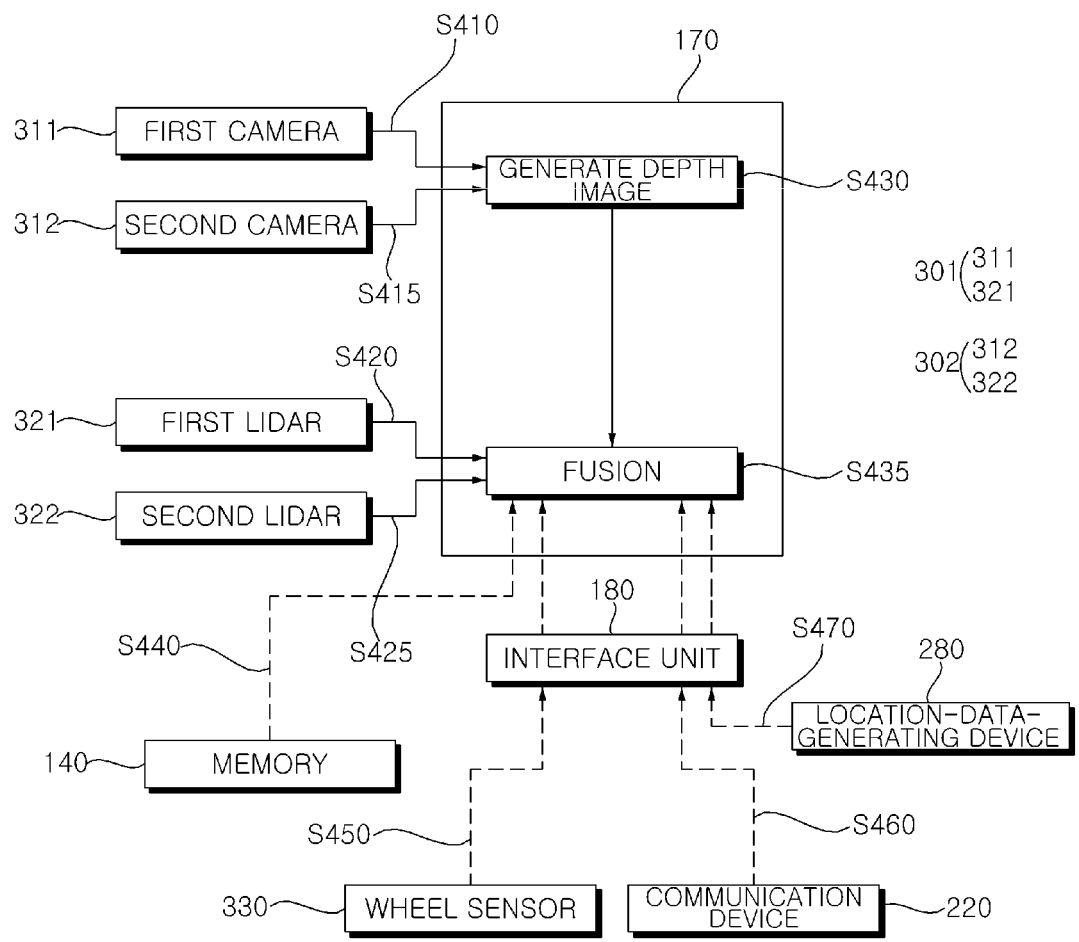
FIG. 4 is a view for explaining the electronic device for a vehicle according to the embodiment of the present disclosure.

FIG. 4 is a view for explaining the electronic device for a vehicle according to the embodiment of the present disclosure.

Referring to FIG. 4, the vehicular electronic device 100 may include a first sensing device 301, a second sensing device 302, a memory 140, a processor 170, and an interface unit 180. Although not shown in FIG. 4, the vehicular electronic device 100 may further include a power supply unit.

The first sensing device 301 may be mounted in the vehicle 10. The first sensing device 301 may be mounted in the vehicle 10 so as to enable adjustment of the posture thereof. The first sensing device 301 may enable adjustment of the posture thereof in roll, pitch, and yaw directions. The first sensing device 301 may include a first camera 311 for generating first image data and a first lidar 321 for generating first sensing data. The first sensing device 301 may be implemented in a modular form in which the first camera 311 and the first lidar 321 are coupled while being disposed side by side. The description of the first camera and the first lidar made with reference to FIG. 3 may be applied to the first camera 311 and the first lidar 321. Each of the first camera 311 and the first lidar 321 may enable adjustment of the posture thereof in roll, pitch, and yaw directions.

The first sensing device 301 may be mounted in the vehicle 10 at the same height as the second sensing device 302 with respect to the ground.

The first camera 311 may be mounted in the vehicle 10 such that a line connecting a first principal point of a first image acquired by the first camera 311 and a second principal point of a second image acquired by the second camera 312 is parallel to a horizontal line.

The second sensing device 302 may be mounted in the vehicle 10 so as to be spaced apart from the first sensing device 301. The second sensing device 302 may be mounted in the vehicle 10 so as to enable adjustment of the posture thereof. The second sensing device 302 may enable adjustment of the posture thereof in roll, pitch, and yaw directions. The second sensing device 302 may include a second camera 312 for generating second image data and a second lidar 322 for generating second sensing data. The second sensing device 302 may be implemented in a modular form in which the second camera 312 and the second lidar 322 are coupled while being disposed side by side. The description of the second camera and the second lidar made with reference to FIG. 3 may be applied to the second camera 312 and the second lidar 322. Each of the second camera 312 and the second lidar 322 may enable adjustment of the posture thereof in roll, pitch, and yaw directions.

The second camera 312 may be mounted in the vehicle 10 such that a line connecting a second principal point of a second image acquired by the second camera 312 and a first principal point of a first image acquired by the first camera 311 is parallel to a horizontal line.

The second sensing device 302 may be mounted in the vehicle 10 at the same height as the first sensing device 301 with respect to the ground.

The description made with reference to FIG. 3 may be applied to the memory 140. The description made with reference to FIG. 3 may be applied to the interface unit 180. The description made with reference to FIG. 3 may be applied to the power supply unit.

The description made with reference to FIG. 3 may be applied to the processor 170. The processor 170 may generate a depth image based on first image data and second image data. The processor 170 may fuse the first sensing data and the second sensing data for each of the divided regions in the depth image.

Hereinafter, a method of operating the vehicular electronic device will be described.

The processor 170 may receive first image data from the first camera 311 (S410). The processor 170 may receive second image data from the second camera 312 (S415). The processor 170 may receive first sensing data from the first lidar 321 (S420). The processor 170 may receive second sensing data from the second lidar 322 (S425).

The processor 170 may generate a depth image based on the first image data and the second image data (S430). The processor 170 may fuse the first sensing data for each of the divided regions in the depth image (S435).

The fusing step S435 may include acquiring, by at least one processor, red-green-blue (RGB)-level data for each region of the depth image, and acquiring, by the at least one processor, a distance value for each region of the depth image based on the table in which distance values for RGB levels are arranged.

The fusing step S435 may include dividing, by the at least one processor, the depth image into a plurality of regions, each having a first area, to acquire RGB-level data for each of the divided regions, and acquiring, by the at least one processor, a distance value corresponding to the RGB level for each of the divided regions from the table.

The fusing step S435 may include dividing, by the at least one processor, the depth image such that each of the plurality of regions has a size in which two or three beam points of the first lidar are formed.

The fusing step S435 may include dividing, by the at least one processor, the depth image into a plurality of first regions, each having a first area, and a plurality of second regions, each having a second area, which is larger than the first area, to acquire RGB-level data for each of the divided regions, and acquiring, by the at least one processor, a distance value corresponding to the RGB level for each of the divided regions from the table.

The fusing step S435 may include setting, by the at least one processor, a region of interest in the depth image to divide the region of interest into a plurality of first regions, and dividing, by the at least one processor, a region, other than the region of interest, into a plurality of second regions in the depth image.

The fusing step S435 may include fusing, by the at least one processor, the depth image and the first sensing data using a simultaneous localization and mapping (SLAM) algorithm.

The fusing step S435 may include receiving, by the at least one processor, first image data photographed at a first time point from the first camera, receiving, by the at least one processor, second image data photographed at the first time point from the second camera, receiving, by the at least one processor, first sensing data acquired at the first time point from the first lidar, generating, by the at least one processor, a depth image of the first time point based on the first image data photographed at the first time point and the second image data photographed at the first time point, and fusing, by the at least one processor, the first sensing data acquired at the first time point for each of the divided regions in the depth image captured at the first time point. The fusing step S435 may further include receiving, by the at least one processor, first image data photographed at a second time point from the first camera, receiving, by the at least one processor, second image data photographed at the second time point from the second camera, and generating, by the at least one processor, a depth image of the second time point based on the first image data photographed at the second time point and the second image data photographed at the second time point. The fusing step (S435) may further include receiving, by the at least one processor, first sensing data acquired at the second time point from the first lidar, fusing, by the at least one processor, the first sensing data acquired at the second time point for each of the divided regions in the depth image of the first time point, and fusing, by the at least one processor, the first sensing data acquired at the second time point for each of the divided regions in the depth image of the second time point. The fusing step S435 may further include acquiring, by the at least one processor, a moving distance value of the vehicle from the first time point to the second time point, and applying, by the at least one processor, the moving distance value to the depth image captured at the first time point to fuse the first sensing data acquired at the second time point into the depth image.

The fusing step S435 may include receiving, by the at least one processor, location data of another vehicle through the communication device, and detecting, by the at least one processor, an object corresponding to the other vehicle from the depth image to correct the value of the distance between the vehicle and the other vehicle based on the location data.

The fusing step S435 may further include receiving, by the at least one processor, second sensing data from the second lidar, and fusing, by the at least one processor, the second sensing data for each of the divided regions in the depth image.

Figure 5:
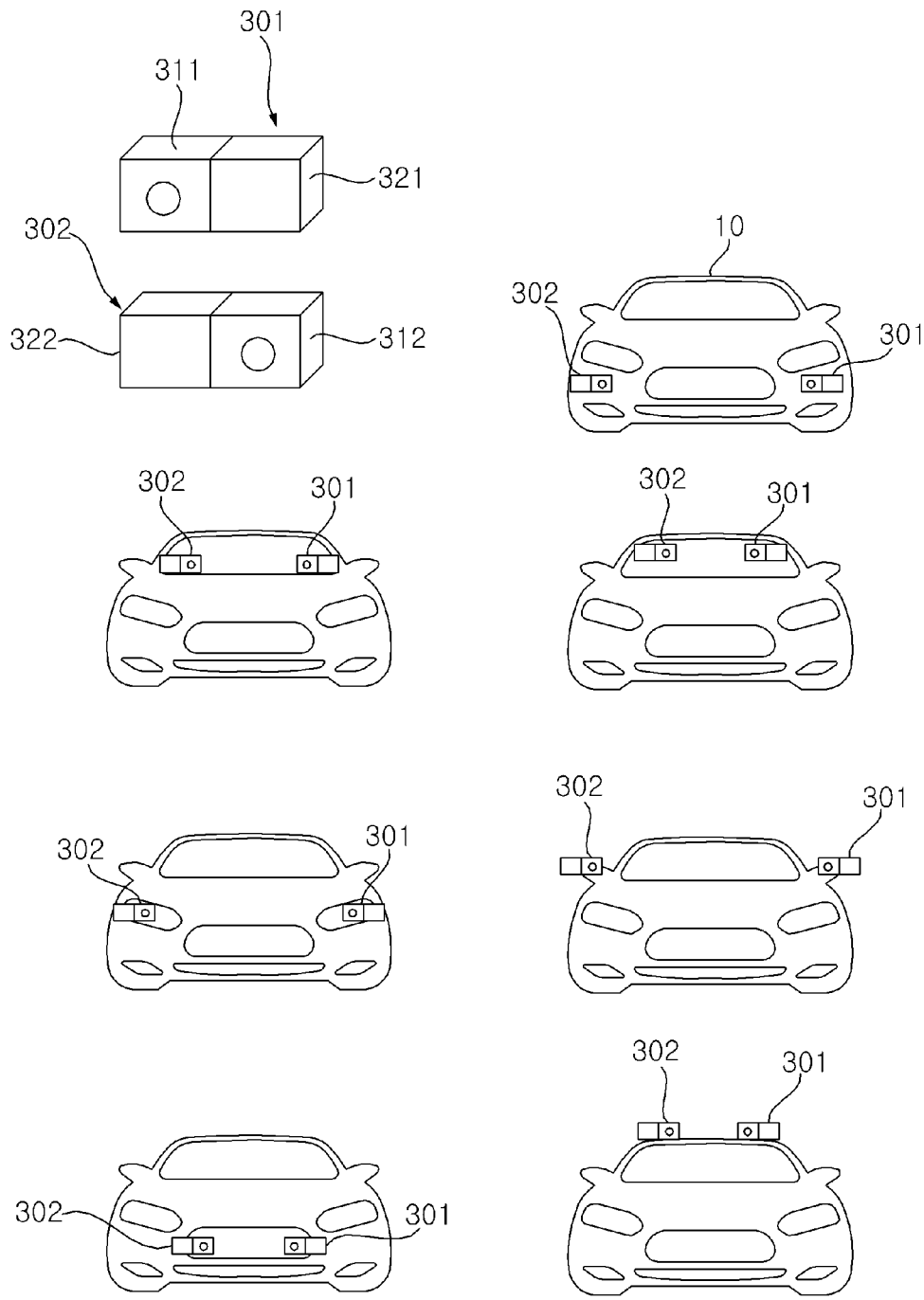
FIG. 5 is a view for explaining a first sensing device and a second sensing device according to the embodiment of the present disclosure.

FIG. 5 is a view for explaining the first sensing device and the second sensing device according to the embodiment of the present disclosure.

A conventional object detection device determines the type of an object through deep learning of a depth image of an RGB image. The object detection device using an image has lower accuracy with respect to a distance to an object than when using another sensor. The sensing devices 301 and 302 according to the present disclosure may generate an RGB-D map by mapping distance information from the lidar to RGB-pixel information, and may perform deep learning using the RGB-D map information, thereby accurately detecting information about the distance to the object. To this end, in addition to the above-described operation, the processor 170 may further perform generation of an RGB-D map and deep learning based on the RGB-D map. The above-described method of detecting an object by fusing raw data of distance information into an image may be described as low-level sensor fusion.

Meanwhile, a general vehicle may include a low-priced lidar. A lidar that is manufactured at low cost may have a relatively small number of layers. For example, each of the first lidar 321 and the second lidar 322 may have four layers. Since the layers of such a lidar are not disposed densely, distance information with respect to pixels of an image may not be accurate.

The electronic device for a vehicle according to the present disclosure may implement precise RBG-D by fusing sensing data of the lidar into a depth image.

Referring to FIG. 5, the first sensing device 301 may include a first camera 311 and a first lidar 321. The second sensing device 302 may include a second camera 312 and a second lidar 322.

The first sensing device 301 and the second sensing device 302 may be mounted in the vehicle 10. For example, the first and second sensing devices 301 and 302 may be mounted in at least one of a bumper, a portion of the inner side of a windshield (the side oriented toward a cabin), a headlamp, a side mirror, a radiator grill, or a roof. When the first sensing device 301 and the second sensing device 302 are mounted in the inner side of the windshield, this is advantageous in that a separate device for removing foreign substances is not necessary due to a wiper. When the first sensing device 301 and the second sensing device 302 are mounted in the roof, this is advantageous in terms of heat dissipation. In addition, when the first sensing device 310 and the second sensing device 302 are mounted in the roof, this is advantageous in terms of an increase in sensing distance. When the first sensing device 301 and the second sensing device 302 are mounted in the headlamp or the radiator grill, they may not be exposed outside and thus may provide an aesthetic improvement. When the first sensing device 301 and the second sensing device 302 are mounted in the side mirror, this is advantageous in terms of linkage with other sensors mounted in the side mirror.

When the mounting distance between the first sensing device 301 and the second sensing device 302 is longer, the sensing distance thereof may increase.

The first sensing device 301 may be mounted at the same height as the second sensing device 302. Since the first sensing device 301 and the second sensing device 302 are mounted at the same height, a depth image may be generated. Since the first sensing device 301 and the second sensing device 302 are mounted at the same height, sensing data acquired from the first lidar 321 and the second lidar 322 may be matched to the depth image.

Figure 6:
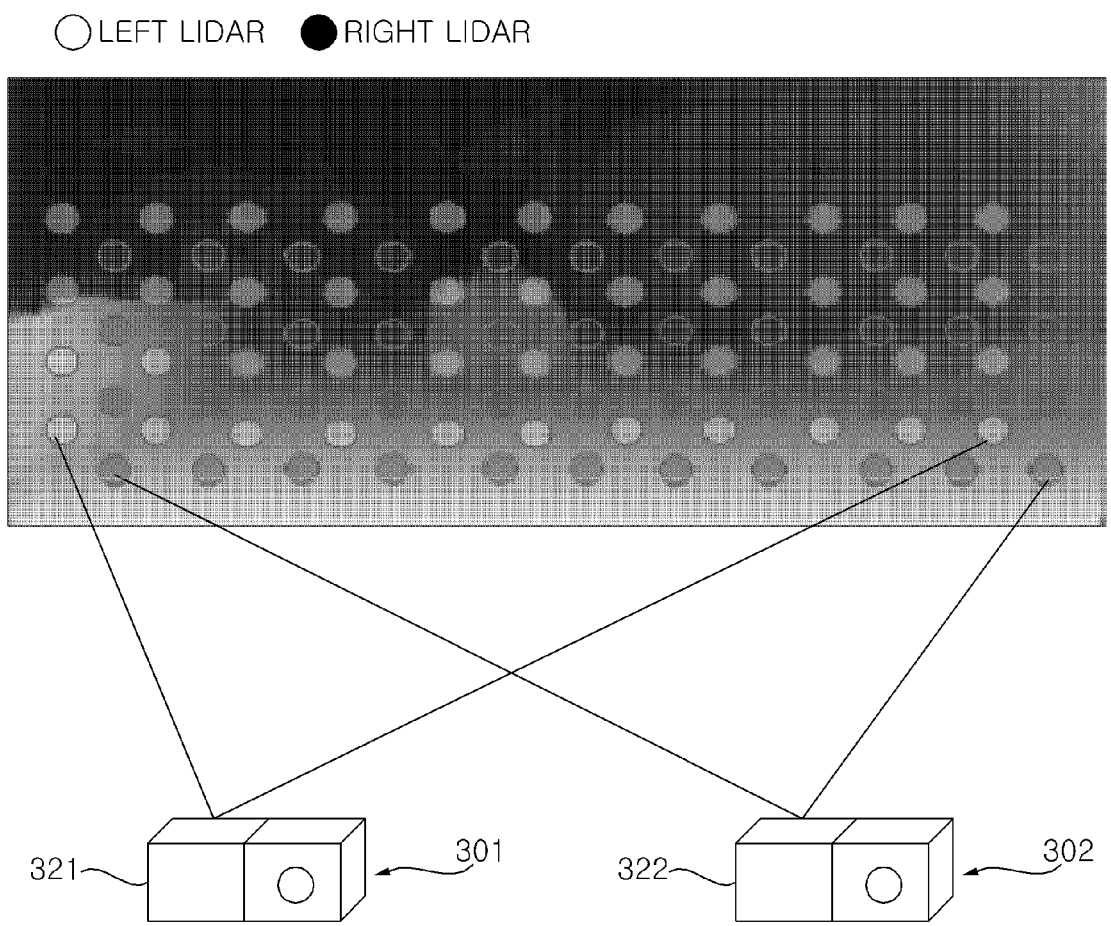
FIG. 6 is a view for explaining a lidar according to the embodiment of the present disclosure.

FIG. 6 is a view for explaining the lidar according to the embodiment of the present disclosure.

Referring to FIG. 6, each of the first lidar 321 and the second lidar 322 may have N channel layers. When the first sensing device 301 and the second sensing device 302 are mounted in the vehicle 10, first sensing data of the first lidar 321 and second sensing data of the second lidar 322 may be used. In this case, the lidars may operate like a lidar having 2N channel layers. That is, the first lidar 321 and the second lidar 322 may operate as a lidar capable of realizing 2N-point vertical detection.

Figure 7:
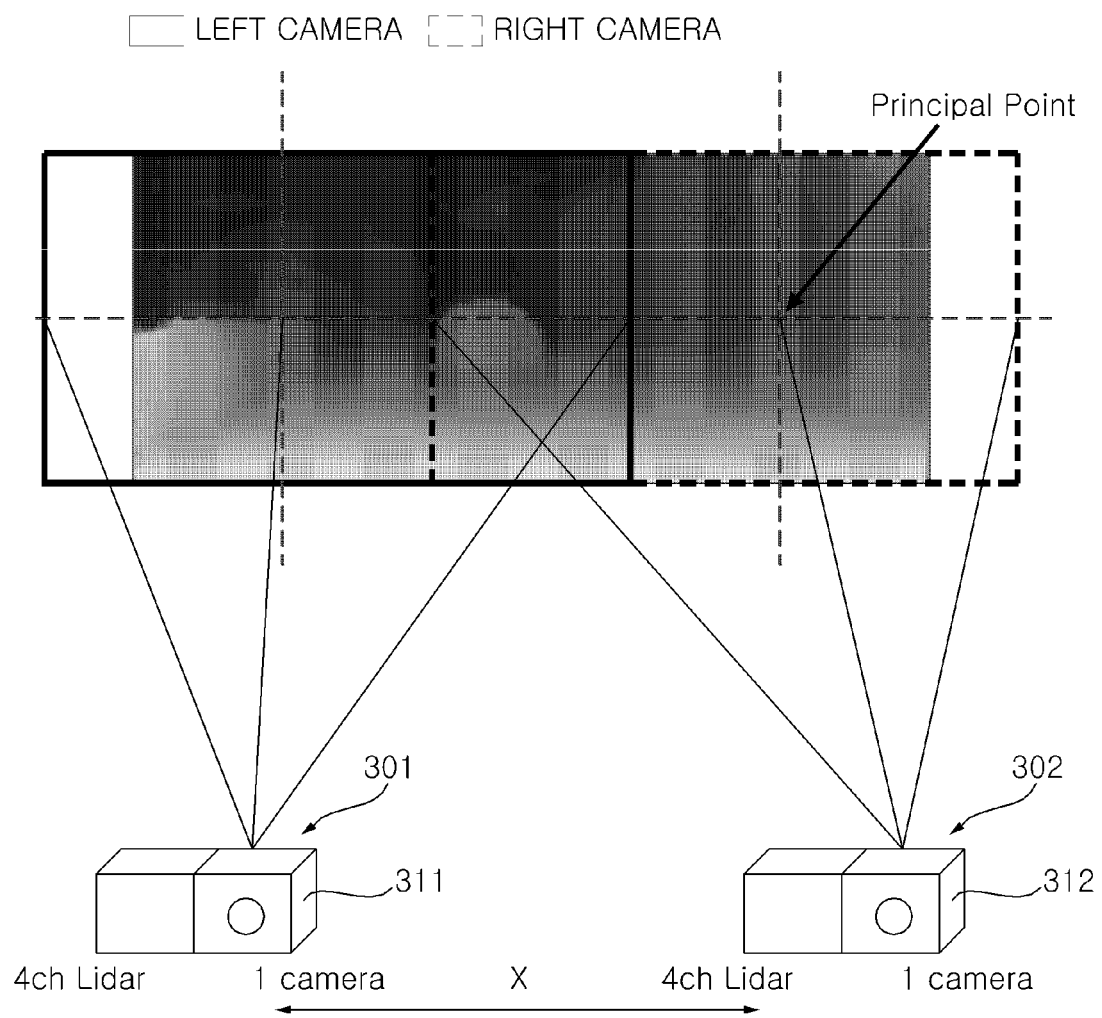
FIG. 7 is a view for explaining a camera according to the embodiment of the present disclosure.

FIG. 7 is a view for explaining the camera according to the embodiment of the present disclosure.

Referring to FIG. 7, the first camera 311 may be disposed parallel to the second camera 312. A first image sensor of the first camera 311 may be disposed parallel to a second image sensor of the second camera 312. The first camera 311 and the second camera 312 may be mounted in the vehicle 10 such that a line connecting a first principal point of a first image acquired by the first camera 311 and a second principal point of a second image acquired by the second camera 312 is parallel to a horizontal line in each of the first image and the second image. Alternatively, the first camera 311 and the second camera 312 may be mounted in the vehicle 10 such that a line connecting a first principal point of a first image acquired by the first camera 311 and a second principal point of a second image acquired by the second camera 312 is parallel to the ground.

When the distance between the first camera 311 and the second camera 312 is longer, a sensing distance increases, which is advantageous in terms of long-distance sensing. When the distance between the first camera 311 and the second camera 312 is shorter, a sensing distance decreases, which is advantageous in terms of near field sensing.

The operation of the vehicular electronic device will be described with reference to FIGS. 8 to 14. The operation to be described below may be performed by the processor of the vehicular electronic device.

Figure 8:
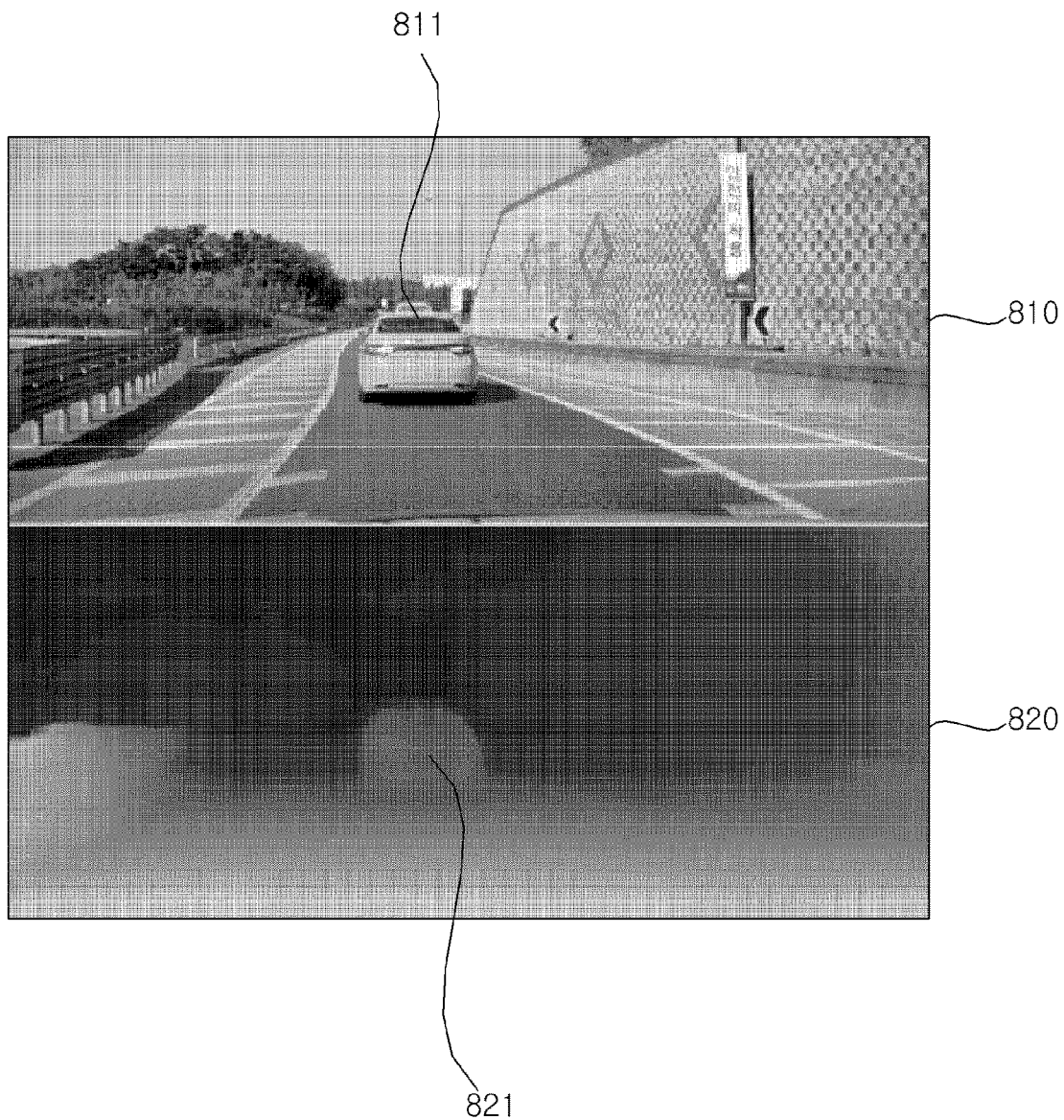
FIG. 8 is a view for explaining a depth image according to the embodiment of the present disclosure.

FIG. 8 is a view for explaining a depth image according to the embodiment of the present disclosure.

Referring to FIG. 8, reference numeral 810 denotes an image captured by the first camera 311 or the second camera 312. Reference numeral 820 denotes a depth image generated using a first image of the first camera 311 and a second image of the second camera 312. It is possible to verify a relative location difference for each pixel in the depth image, but an error may occur in the distance between the vehicle 10 and an object 811. This error may be compensated for using at least one of first sensing data of the first lidar 321 or second sensing data of the second lidar 322. By fusing the sensing data of the lidar into the depth image, it is possible to more accurately detect an object using detection and classification of the object, distance information of the lidar, and reflection intensity information.

The result generated by fusing the sensing data of the lidar into the depth image data may be referred to as RGB-D data. "RGB" is a value corresponding to red, green, and blue of an image. "D" may include distance information and reflection intensity information based on the sensing data of the lidar.

Figure 9:
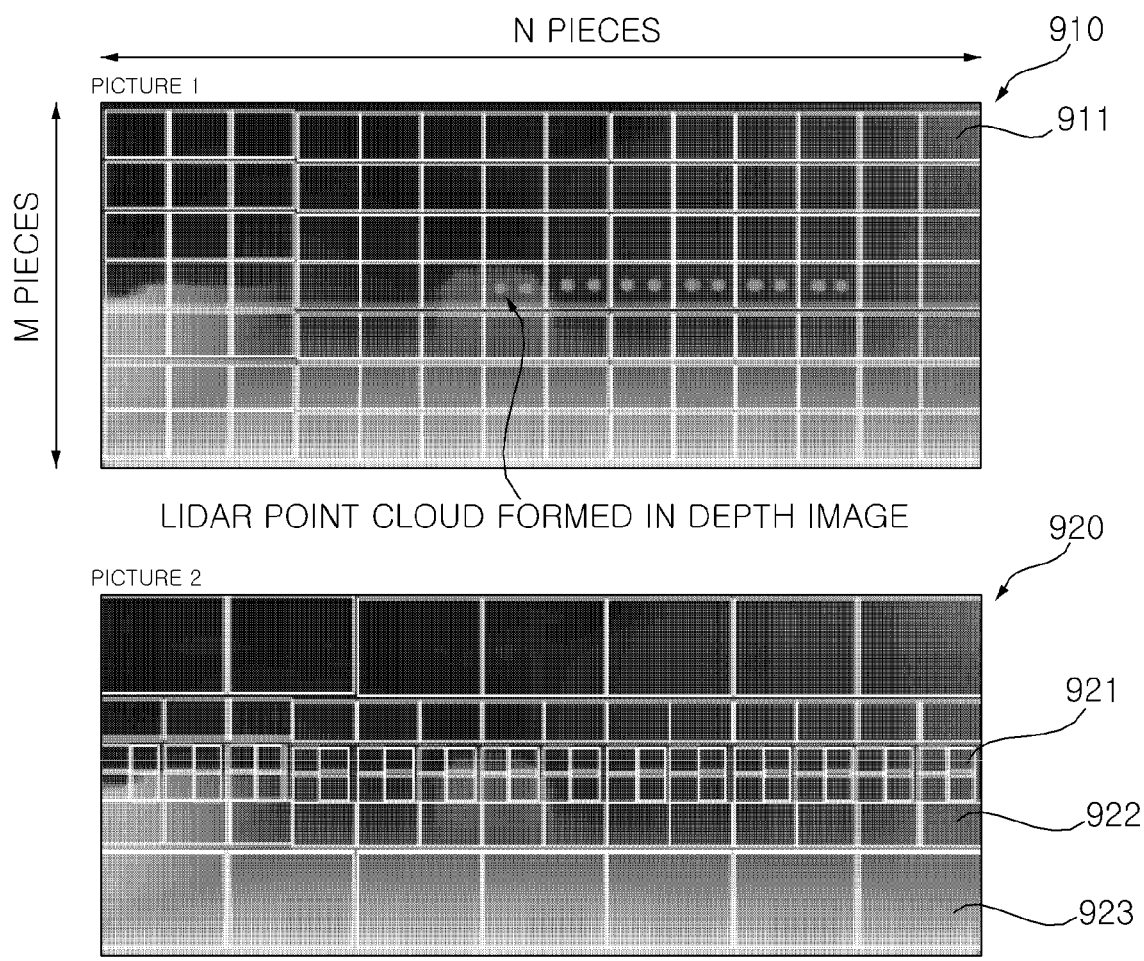
FIG. 9 is a view for explaining a depth image, which is divided into a plurality of regions, according to the embodiment of the present disclosure.

FIG. 9 is a view for explaining a depth image, which is divided into a plurality of regions, according to the embodiment of the present disclosure.

Referring to FIG. 9, the processor 170 may correct distance information using a lookup table in order to create an RGB-D map. In the depth image, color represents distance. If the colors are the same for each RGB within a similar region range in the depth image, it is possible to perform correction using sensing data (distance information) of the lidar regardless of time.

The processor 170 may divide the depth image into a plurality of regions (M*N) having a first area, as indicated by reference numeral 910. The processor 170 may divide the depth image into regions such that two or three points of the lidar are formed in one region 911 of the divided regions.

The processor 170 may divide the depth image into regions 921, 922 and 923 having different sizes, as indicated by reference numeral 920. The processor 170 may divide the depth image into a plurality of first regions 921, each having a first area, a plurality of second regions 922, each having a second area, which is larger than the first area, and a plurality of third regions 923, each having a third area, which is larger than the second area. The amount of calculation may be reduced by differentiating the sizes of the divided areas depending on the region of interest.

If A is a sampling time, when t=0, the RGB value (the RBG value in the depth image is a distance value) of a pixel, which corresponds to a point cloud of the lidar, may be obtained by selecting one region from the divided regions in the depth image, thereby creating a lookup table that stores sensing data (a distance value) of the lidar corresponding to the RGB value.

The distance information of the lidar corresponding to the RGB value may be updated by repeating the process when t=A sec and when t=2A sec. By repeating this process, it is possible to create a lookup table that has distance information of the lidar corresponding to the color of the depth image in one region of the depth image. If this process is performed for all regions, it is possible to obtain lidar correction information corresponding to the distance information of the depth image in all regions. An RGB-D map may be created by adding the distance information of the lidar obtained with respect to each pixel to the RGB image data of the camera. RGB-D may be defined as information in which distance information is included in image information. In addition to distance information, intensity or other additional information of the lidar may be assigned to D.

The lookup table may be created before the vehicle 10 is released from a factory, and the vehicle 10 may update the lookup table according to the settings of the vehicle while traveling.

FIG. 10 is a view for explaining a table in which distance values for respective colors are arranged according to the embodiment of the present disclosure.

Referring to FIG. 10, when the lidar correction lookup table for the depth image is completed, accurate location information of the camera may be corrected without the help of the lidar. When the RGB information of the colors of the depth image can be expressed up to (0 to 255, 0 to 255, 0 to 255), the number of R, G and B combinations is 256, and thus it is required to create a large number of lookup tables, which may cause a problem in storage and processing of data.

It may be more efficient from the aspect of memory usage to convert the R, G and B sizes of the depth image small when creating the lookup table. If a small depth image such as one having, for example, 4 bits is formed, the lookup table may be created in a (0 to 15, 0 to 15, 0 to 15) form, as indicated by reference numeral 1010. Alternatively, as indicated by reference numeral 1020, if a single-color image is formed among red, green and blue and thus 256 distance values are obtained, it is possible to simply express the values using 256 lookup tables.

If the size of the lookup table is estimated according to the resolution of the lidar and the RGB bit of the depth image is set according thereto, it is possible to generate a lookup table having an appropriate size.

Figure 11:
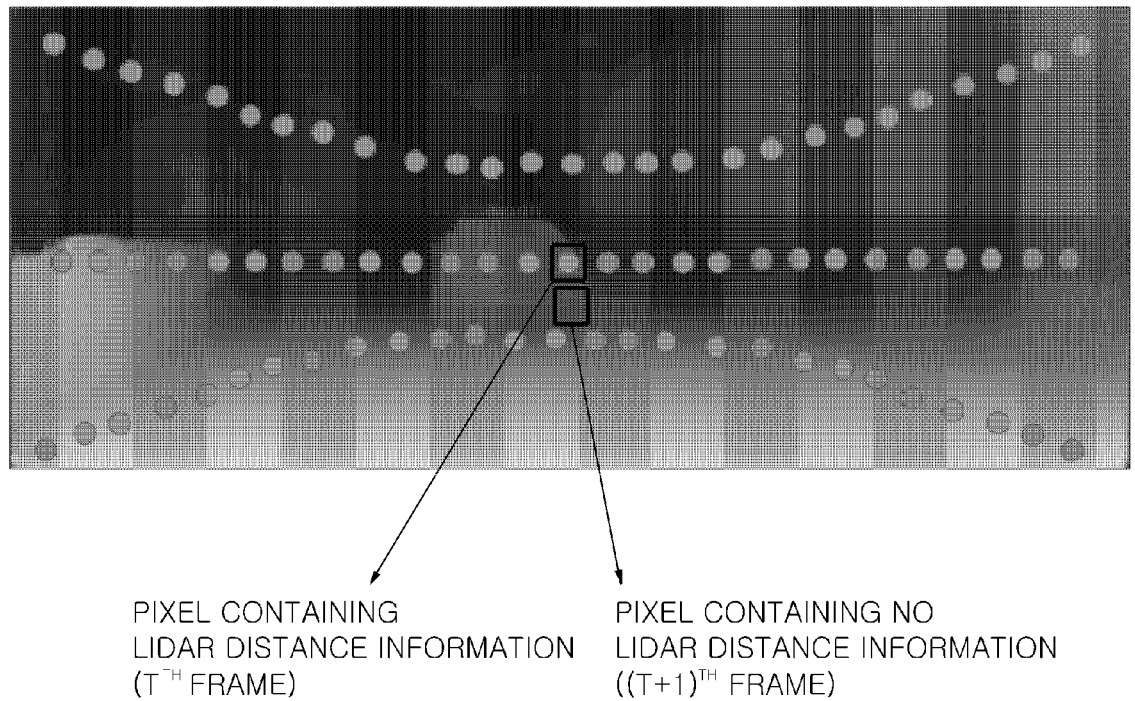
FIG. 11 is a view for explaining the operation of performing sensor fusion using a SLAM algorithm according to the embodiment of the present disclosure.
Figure 11:
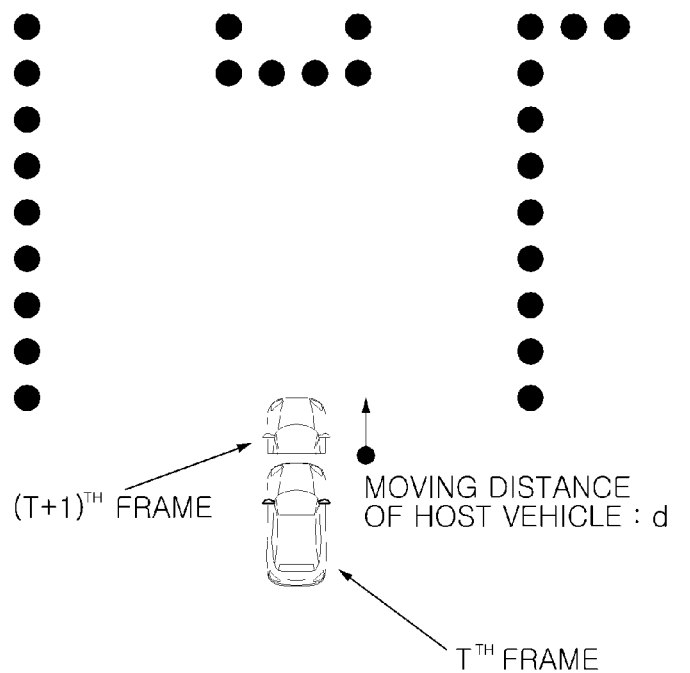

FIG. 11 is a view for explaining the operation of performing sensor fusion using a SLAM algorithm according to the embodiment of the present disclosure.

Referring to FIG. 11, in order to form an RGB-D, the processor 170 may measure the moving distance of the vehicle 10 using a SLAM and may estimate the location to which the pixel of the image has moved using the measured distance. It is possible to create a map of the surroundings of the vehicle by applying a SLAM algorithm of the lidar and to accurately estimate the distance that the vehicle 10 has recently moved using the feature of the map. If using the wheel sensor of the vehicle 10 and the SLAM algorithm of the lidar, it is possible to estimate the location of the vehicle 10 using only the wheel sensor, even when there is no feature of the lidar. When there is a feature of the lidar, it is possible to calculate the moving distance of the vehicle 10 using the lidar and to correct the moving distance of the vehicle 10 detected by the wheel sensor using the calculated moving distance.

Because the point cloud information of the lidar is not dense, lidar distance information may be present in some pixels, but may not be present in other pixels. When the vehicle 10 moves forwards, the pixel in which the lidar distance information is contained moves to another position in the image. If the distance that the vehicle 10 has moved is accurately verified, it is possible to verify the position to which the pixel has moved and to input distance information to the corresponding pixel.

Referring to FIG. 11, when lidar information and RGB information corresponding thereto are present in the $t^{th}$ frame, the distance information that is corrected in the $(t+1)^{th}$ frame, which is next to the $t^{th}$ frame, according to the movement of the vehicle 10 is a value obtained by subtracting the moving distance information of the vehicle 10 from the distance information of the previous pixel. If the distance information is updated over time with respect to all pixels containing the distance information of the lidar through the above process, the distance information of the lidar in many pixels is updated, thereby generating distance information with respect to the RGB pixel and consequently creating an RGB-D map.

If the ratio of RGB to RGB-D in the image is 50:50, it is possible to produce RGB-D information in almost every RGB by increasing the size of the pixel of the RGB by two to three times.

Figure 12:
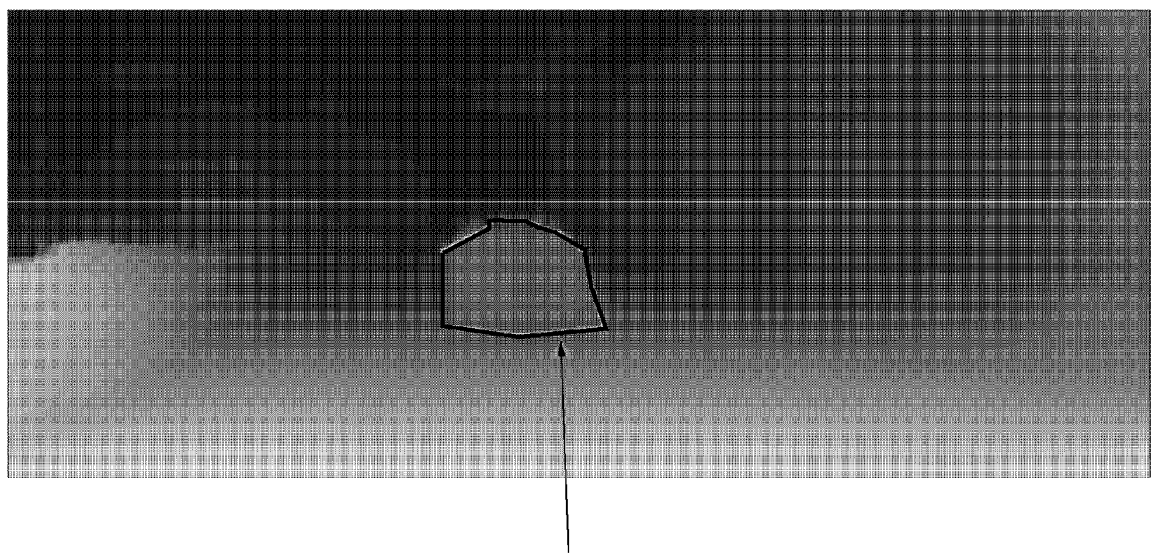
FIG. 12 is a view for explaining the operation of performing sensor fusion using V2X according to the embodiment of the present disclosure.

FIG. 12 is a view for explaining the operation of performing sensor fusion using V2X according to the embodiment of the present disclosure.

Referring to FIG. 12, in order to form an RGB-D map, the processor 170 may perform correction using data received through the communication device 220. In this case, the communication device 220 may use a V2X or 5G communication scheme. Since it is possible to verify the location of the preceding vehicle through V2X or 5G communication, the distance value of the depth image may be corrected using the location information of the vehicle 10 received through communication by matching the location of the preceding vehicle to the depth image. The vehicle 10 may be recognized through the images of the cameras 311 and 312, and the outline of the vehicle 10 may be extracted from the depth image. RGB-D information may be generated using distance information received through the communication device 220. The method described with reference to FIG. 12 may be applied in terms of safety when it is impossible to update the lookup table due to failure of the lidar or adhesion of foreign substances.

Figure 13:
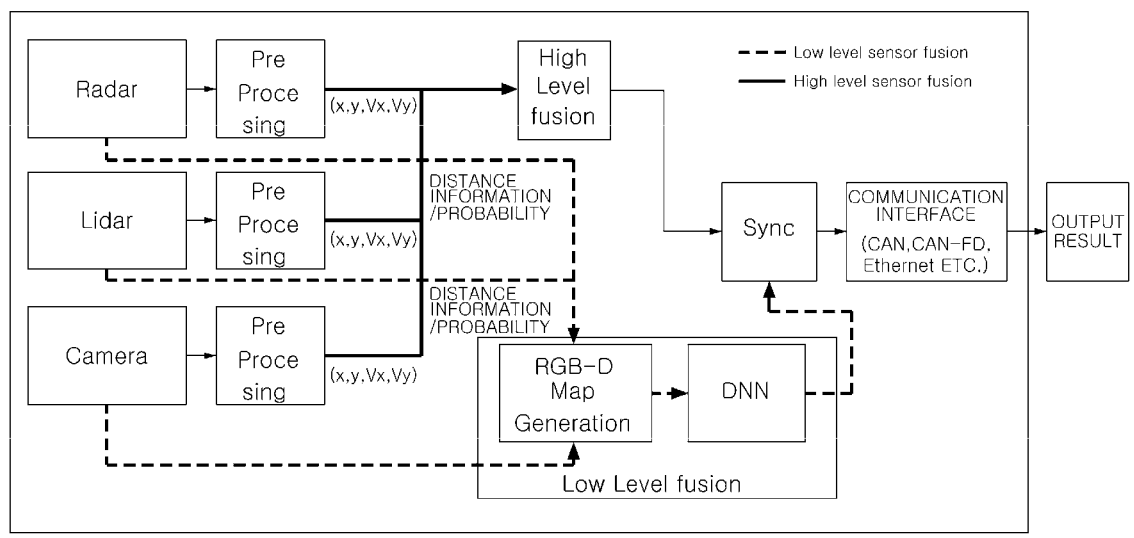
FIGS. 13 and 14 are views for explaining the operation of performing high-level fusion and low-level fusion according to the embodiment of the present disclosure.
Figure 14:
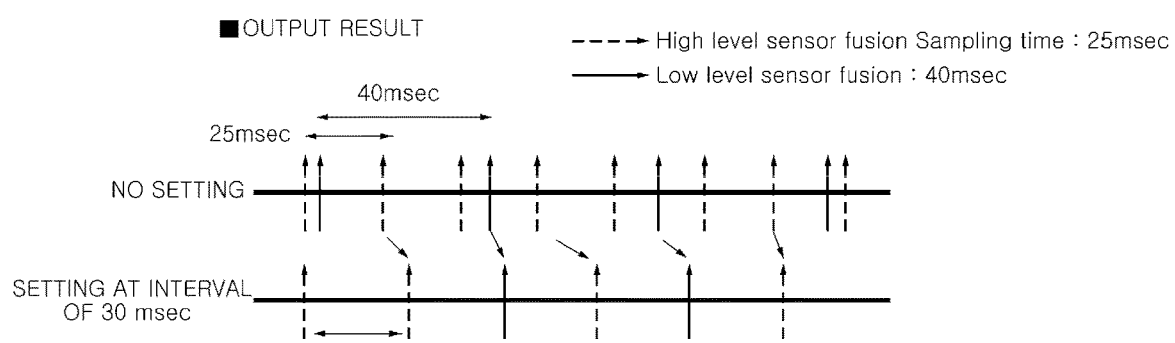

FIGS. 13 and 14 are views for explaining the operation of performing high-level fusion and low-level fusion according to the embodiment of the present disclosure.

Referring to FIG. 13, the vehicular electronic device 100 may output two results having redundancy in terms of failure safety. In detail, the vehicular electronic device 100 may perform high-level fusion and low-level fusion.

The vehicular electronic device 100 may perform fusion using location information of an object detected by the respective sensors (the radar, the lidar, and the camera). Such fusion may be understood as high-level fusion. The vehicular electronic device 100 may perform fusion in the stage of low data (RGB image and distance information) of the sensors (the radar, the lidar, and the camera). Such fusion may be understood as low-level fusion. Thereafter, the vehicular electronic device 100 may detect an object through deep learning.

Referring to FIG. 14, the processor 170 may output the high-level fusion result value and the low-level fusion result value through algorithm sampling without performing synchronization setting thereof (hereinafter referred to as "output 1"). For example, the result value of the high-level sensor fusion may be output every 40 msec. For example, the result value of the low-level sensor fusion may be output every 25 msec. The processor 170 may receive and determine the result value of the high-level sensor fusion and the result value of the low-level sensor fusion in order to use a result value that is more suitable for control or to predict a system error when the two result values are different.

The processor 170 may output the high-level fusion result value and the low-level fusion result value through synchronization setting thereof (hereinafter referred to as "output 2"). For example, the result value of the high-level sensor fusion and the result value of the low-level sensor fusion may be output every 30 msec.

The method of output 1 imposes a large load but has an advantage of being capable of building a relatively safe system. The method of output 2 imposes a small load and is capable of detecting objects using result values of various algorithms.

The aforementioned present disclosure may be implemented as computer-readable code stored on a computer-readable recording medium. The computer-readable recording medium may be any type of recording device in which data is stored in a computer-readable manner. Examples of the computer-readable recording medium include a Hard Disk Drive (HDD), a Solid-State Disk (SSD), a Silicon Disk Drive (SDD), Read-Only Memory (ROM), Random-Access Memory (RAM), CD-ROM, magnetic tapes, floppy disks, optical data storage devices, carrier waves (e.g. transmission via the Internet), etc. In addition, the computer may include a processor and a controller. The above embodiments are therefore to be construed in all aspects as illustrative and not restrictive. It is intended that the present disclosure cover the modifications and variations of this disclosure provided they come within the scope of the appended claims and their equivalents.

DESCRIPTION OF REFERENCE NUMERALS

10: vehicle
100: vehicular electronic device

The invention claimed is:

1. An electronic device for a vehicle, comprising:
a processor configured to:
receive first image data from a first camera,
receive second image data from the first camera or a second camera,
receive first sensing data from a first lidar,
generate a depth image based on the first image data and the second image data,
divide the depth image into a plurality of regions,
perform fusion of the first sensing data for each of the plurality of regions in the depth image,
acquire red-green-blue (RGB)-level data for each of the plurality of regions, and
acquire a distance value corresponding to an RGB-level for each of the plurality of regions based on a table in which distance values for RGB-levels are arranged.

2. The electronic device of claim 1, wherein the processor is configured to divide the depth image such that each of the plurality of regions has a size in which two or three beam points of the first lidar are formed.

3. The electronic device of claim 2, wherein the processor is configured to:
divide the depth image into (i) a plurality of first regions, each of the first regions having a first area and (ii) a plurality of second regions, each of the second regions having a second area, which is larger than the first area,
acquire RGB-level data for each of the first and second regions, and
acquire a distance value corresponding to an RGB level for each of the first and second regions from the table.

4. The electronic device of claim 3, wherein the processor is configured to:
set a region of interest in the depth image, divide the region of interest into the plurality of first regions, and
set a region except the region of interest as the plurality of second regions in the depth image.

5. The electronic device of claim 1, wherein the processor is configured to perform fusion of the depth image and the first sensing data using a simultaneous localization and mapping (SLAM) algorithm.

6. The electronic device of claim 5, wherein the processor is configured to:
receive first image data photographed at a first time point from the first camera,
receive second image data photographed at the first time point from the second camera,
receive first sensing data acquired at the first time point from the first lidar,
generate a depth image of the first time point based on the first image data photographed at the first time point and the second image data photographed at the first time point, and
perform fusion of the first sensing data acquired at the first time point for each of the plurality of regions in the depth image captured at the first time point.

7. The electronic device of claim 6, wherein the processor is configured to:
receive first image data photographed at a second time point from the first camera,
receive second image data photographed at the second time point from the second camera, and
generate a depth image of the second time point based on the first image data photographed at the second time point and the second image data photographed at the second time point.

8. The electronic device of claim 7, wherein the processor is configured to:
receive first sensing data acquired at the second time point from the first lidar,
perform fusion of the first sensing data acquired at the second time point for each of the plurality of regions in the depth image of the first time point, and
perform fusion of the first sensing data acquired at the second time point for each of the plurality of regions in the depth image of the second time point.

9. The electronic device of claim 8, wherein the processor is configured to:
acquire a moving distance value of the vehicle from the first time point to the second time point,
apply the moving distance value to the depth image captured at the first time point, and
perform fusion of the first sensing data acquired at the second time point into the depth image.

10. An electronic device for a vehicle, comprising:
a processor configured to:
receive first image data from a first camera,
receive second image data from the first camera or a second camera,
receive first sensing data from a first lidar,
generate a depth image based on the first image data and the second image data,
perform fusion of the first sensing data for each of divided regions in the depth image,
receive location data of another vehicle through a communicator,
detect an object corresponding to the another vehicle from the depth image, and
correct a value of a distance between the vehicle and the another vehicle based on the location data.

11. The electronic device of claim 1, wherein the processor is configured to receive second sensing data from a second lidar, and further perform fusion of the second sensing data for each of the plurality of regions in the depth image.

12. An electronic device for a vehicle, comprising:
a first sensing device mounted in the vehicle, the first sensing device comprising a first camera generating first image data and a first lidar generating first sensing data;
a second sensing device mounted in the vehicle spaced apart from the first sensing device, the second sensing device comprising a second camera generating second image data and a second lidar generating second sensing data; and at least one processor configured to generate a depth image based on the first image data and the second image data and perform fusion of the first sensing data and the second sensing data for each of divided regions in the depth image;

wherein the at least one processor is configured to:
detect an object corresponding to another vehicle from the depth image to correct a value of a distance between the vehicle and the another vehicle.

13. The electronic device of claim 12, wherein the second sensing device is mounted in the vehicle at a same height as the first sensing device with respect to a ground.

14. The electronic device of claim 13, wherein the first camera is mounted in the vehicle such that a line connecting a first principal point of a first image acquired by the first camera and a second principal point of a second image acquired by the second camera is parallel to a horizontal line.

* * * * *